United States Patent
Huo et al.

(10) Patent No.: US 9,959,046 B2
(45) Date of Patent: May 1, 2018

(54) MULTI-STREAMING MECHANISM TO OPTIMIZE JOURNAL BASED DATA STORAGE SYSTEMS ON SSD

(71) Applicants: Jianjian Huo, San Jose, CA (US); Changho Choi, San Jose, CA (US)

(72) Inventors: Jianjian Huo, San Jose, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days. days.

(21) Appl. No.: 15/089,237

(22) Filed: Apr. 1, 2016

(65) Prior Publication Data

US 2017/0192687 A1    Jul. 6, 2017

Related U.S. Application Data

(60) Provisional application No. 62/273,323, filed on Dec. 30, 2015.

(51) Int. Cl.
| | |
|---|---|
| *G06F 12/00* | (2006.01) |
| *G06F 3/06* | (2006.01) |
| *G06F 13/00* | (2006.01) |
| *G06F 13/28* | (2006.01) |

(52) U.S. Cl.
CPC .......... *G06F 3/0608* (2013.01); *G06F 3/0611* (2013.01); *G06F 3/0616* (2013.01); *G06F 3/0652* (2013.01); *G06F 3/0679* (2013.01)

(58) Field of Classification Search
CPC .... G06F 3/0608; G06F 3/0611; G06F 3/0616; G06F 3/0652; G06F 3/0679
See application file for complete search history.

(56) References Cited

U.S. PATENT DOCUMENTS

| | | | | |
|---|---|---|---|---|
| 6,128,630 | A  * | 10/2000 | Shackelford | ...... G06F 17/30368 |
| 7,363,420 | B2 * | 4/2008 | Lin | ........................ G06F 3/0614 |
| | | | | 711/103 |
| 7,610,442 | B2 | 10/2009 | Kim et al. | |
| 8,738,882 | B2 | 5/2014 | Post et al. | |
| 8,793,531 | B2 | 7/2014 | George et al. | |
| 8,949,684 | B1 * | 2/2015 | Shalvi | .................... G11C 5/005 |
| | | | | 714/763 |
| 2005/0144381 | A1 * | 6/2005 | Corrado | .............. G06F 11/1076 |
| | | | | 711/114 |

(Continued)

FOREIGN PATENT DOCUMENTS

WO      2015126518 A2     8/2015

*Primary Examiner* — Mark A Giardino, Jr.
(74) *Attorney, Agent, or Firm* — Renaissance IP Law Group LLP

(57) ABSTRACT

A system and method for using multi-streaming with journal information (305) and data (325) is disclosed, when using an application (125) and/or a data storage system (120) that performs double-writes. A journal write request (310) can be sent with the journal information (305) specifying that the journal information (305) should be written to one stream (315). The data write request (320) can be sent with the data (325) specifying that the data (325) should be written to another stream (330). A controller (135) on the storage device (130) can then write the journal information (305) to a block (405, 410) associated with the first stream (315) and the data (325) to a block (415, 420) associated with the second stream (330).

21 Claims, 9 Drawing Sheets

(56) References Cited

U.S. PATENT DOCUMENTS

| | | |
|---|---|---|
| 2008/0162662 A1* | 7/2008 | Fujita .................. G06F 11/1464 709/214 |
| 2009/0119352 A1 | 5/2009 | Branda et al. |
| 2009/0157989 A1* | 6/2009 | Karamcheti ........ G06F 12/0246 711/156 |
| 2012/0072798 A1 | 3/2012 | Unesaki et al. |
| 2013/0159626 A1 | 6/2013 | Katz et al. |
| 2014/0149473 A1* | 5/2014 | Kim .................. G06F 17/30091 707/824 |
| 2014/0208001 A1* | 7/2014 | Liu ....................... G06F 3/0685 711/103 |
| 2014/0297918 A1 | 10/2014 | Lee et al. |
| 2016/0266792 A1 | 9/2016 | Amaki et al. |
| 2016/0283125 A1 | 9/2016 | Hashimoto et al. |
| 2016/0313943 A1 | 10/2016 | Hashimoto et al. |
| 2017/0139825 A1* | 5/2017 | Dubeyko ............ G06F 12/0253 |

* cited by examiner

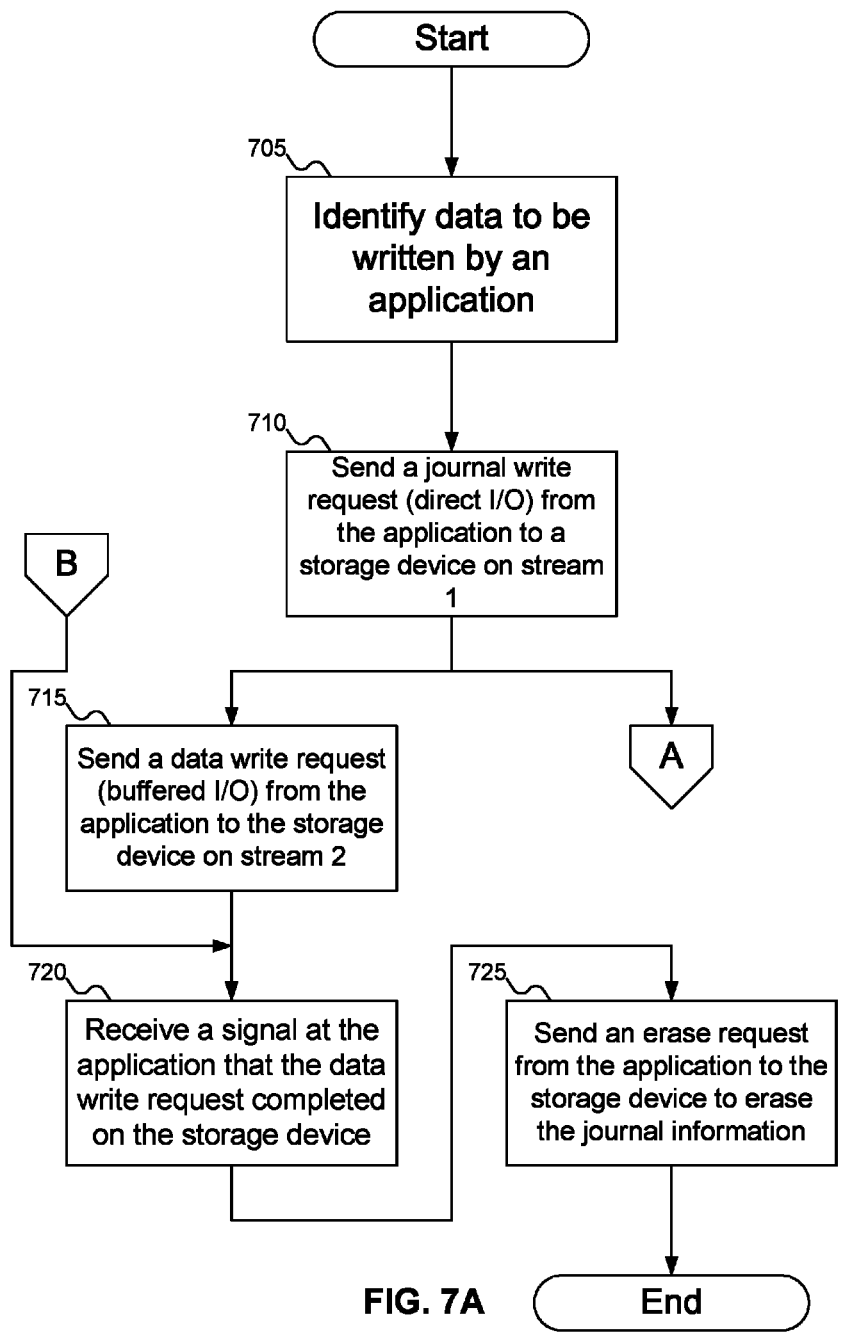

US 9,959,046 B2

MULTI-STREAMING MECHANISM TO OPTIMIZE JOURNAL BASED DATA STORAGE SYSTEMS ON SSD

RELATED APPLICATION DATA

This patent application claims the benefit of U.S. Provisional Patent Application Ser. No. 62/273,323, filed Dec. 30, 2015, which is hereby incorporated by reference.

FIELD

This inventive concept relates to storage devices, and more particularly to optimizing use of storage devices with garbage collection when using applications that perform journaling.

BACKGROUND

NAND flash memory based Solid-State Drives (SSDs) have been used widely in enterprise servers and data centers to accelerate all kinds of data storage systems. Flash memory in SSDs has unique characteristics, so directly replacing a conventional magnetic disk with an SSD does not make use of the device at its full potential. One significant reason is that SSDs only write to free flash memory blocks, and recover invalid flash memory blocks for reuse using a Garbage Collection process. Because conventional operating systems and applications do not distinguish between hot and cold data, the mix of data with different lifespan makes it harder for Garbage Collection to manage and reclaim flash memory. This affects both the performance and the lifetime of the SSD.

Currently, many data storage systems—including object storage systems (e.g., Ceph), block storage systems (e.g., bcache and other caching systems), and file storage systems (e.g., IBM JFS/JFS2, Linux xfs, and Linux ext4)—use journaling for data durability and performance purposes. Such systems store two copies of data: one in the Journal section and one in the data section. When such systems are deployed in a pure SSD environment, they usually store journals and actual data on the same SSD, for performance and cost reasons. When data is received to be written, the data storage system first stores one copy of the data record in a journal that is flushed to the disk, and the second copy of the data is stored in the file system page cache in memory. The data storage system then returns success to the user application. Later, sometime in the background, the data storage systems flush those data records in the file system page cache into disk, and remove the same data records in the journal on disk. This process repeats with each data write, and occurs even if a journal is only used for metadata.

This double-write approach, when used with SSDs, has a problem: flash memory internal fragmentation inside every SSD block. This internal fragmentation problem causes more Garbage Collection, resulting in storage system performance degradation, longer read/write latency, and a shorter SSD lifetime.

A need remains for a way to utilize double-write approaches with SSDs that avoids (or at least minimizes) the fragmentation of the flash memory in the SSD.

BRIEF DESCRIPTION OF THE DRAWINGS

FIGS. 7A-7B show a flowchart of an example procedure for the application of FIG. 1 and the data storage system of FIG. 1 to communicate with the storage device of FIG. 1 and perform both journaling and data writes, according to an embodiment of the inventive concept.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
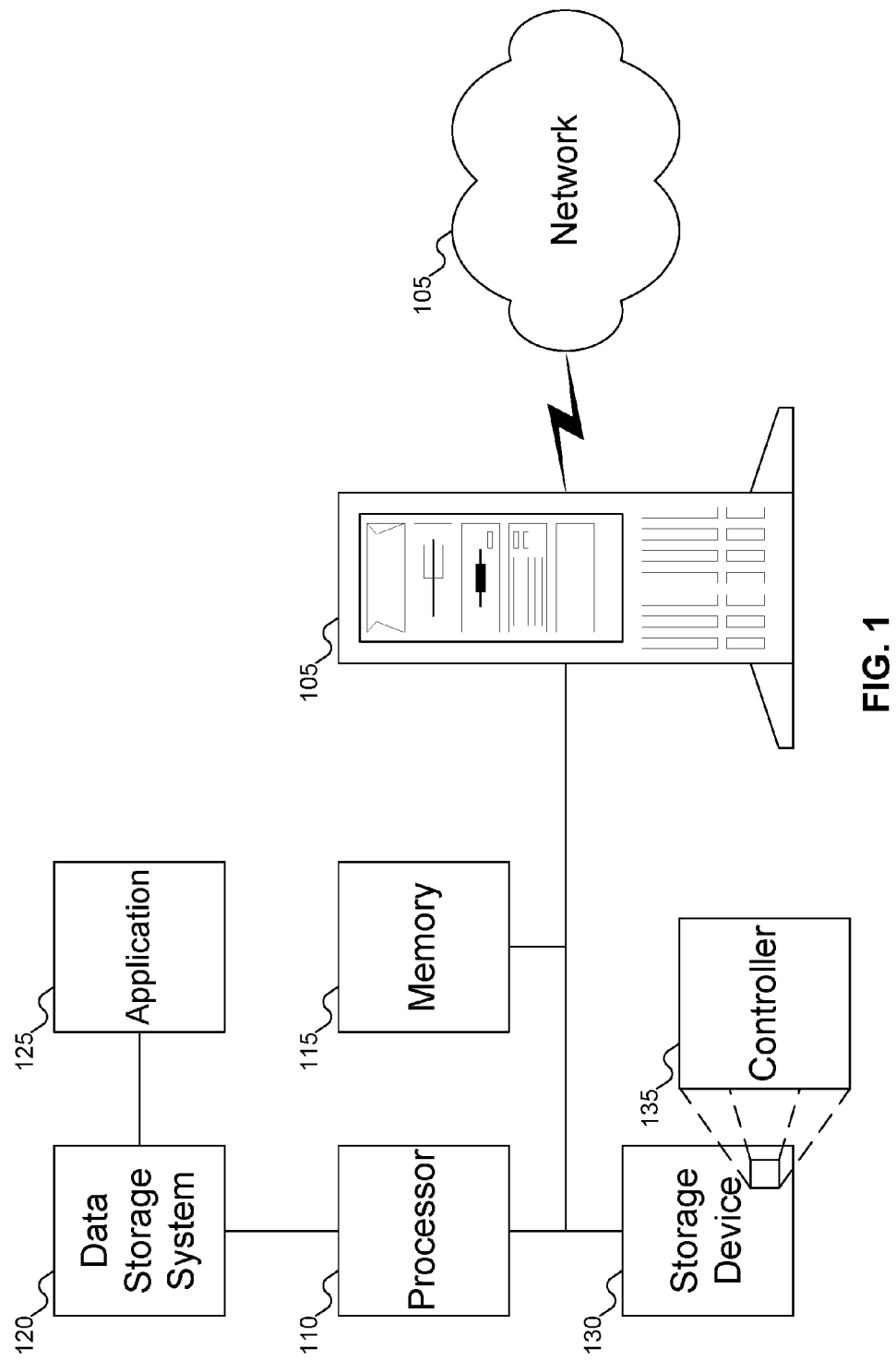
FIG. 1 shows a server that can utilize a data storage system with journaling, according to an embodiment of the inventive concept.

FIG. 1 shows a server that can utilize a data storage system with journaling, according to an embodiment of the inventive concept. In FIG. 1, server 105 is shown. Server 105 can be any variety of server. Server 105 can include processor 110 and memory 115. Processor 110 can be any variety of processor; memory 115 can be any variety of memory.

Running on processor 110 can be data storage system 120. Data storage system 120 can be any system that performs double-writes: that is, both journaling and data writes. Data storage system 120 is intended to include not only object- and file-storage systems, such as Ceph®, but also applications running on other operating systems, where the applications perform double-writes. (Ceph is a registered trademark of Inktank Storage, Inc. in the United States.)

In addition to data storage system 120, application 125 can run on top of data storage system 120. In some embodiments of the inventive concept, application 125 can itself perform double-writes, for internal reasons. For example, application 125 might be a real-time simulation program. Such programs are highly dependent on the time operations are performed. If a real-time simulation program were interrupted with data buffered but unwritten, the results of the simulation might be wasted. Therefore, the simulation program might want to ensure that data is stored via journaling, even if not written to storage device 130 through data storage system 120.

Storage device 130 can be any desired variety of storage device that performs garbage collection of invalid data. As an example, storage device 130 can be a flash-based Solid State Drive (SSD). Storage device 130 can have controller 135, responsible for managing the operations of storage device 130. For example, controller 135 can manage data reads and writes, and can map logical block addresses to physical block addresses on storage device 305, among other functionality. Controller 135 can include, among other components, a physical interface that can connect controller 135 (directly or indirectly) to server 105, a processor that controls the operations of storage device 130, error correction code circuitry to provide error detection and correction capabilities for data stored in the flash storage, a Dynamic Random Access Memory (DRAM) controller to manage DRAM within storage device 130, and one or more flash controllers to manage the flash storage. Controller 135 can also include a multi-streaming controller, which can manage what data is written to what block (with blocks associated with different streams, as described below). In some embodiments of the inventive concept, controller 135 can be a single chip suitably programmed with the functionality of these components; in other embodiments of the inventive concept, controller 135 can include some or all of these components as separate components (e.g., chips).

Figure 2:
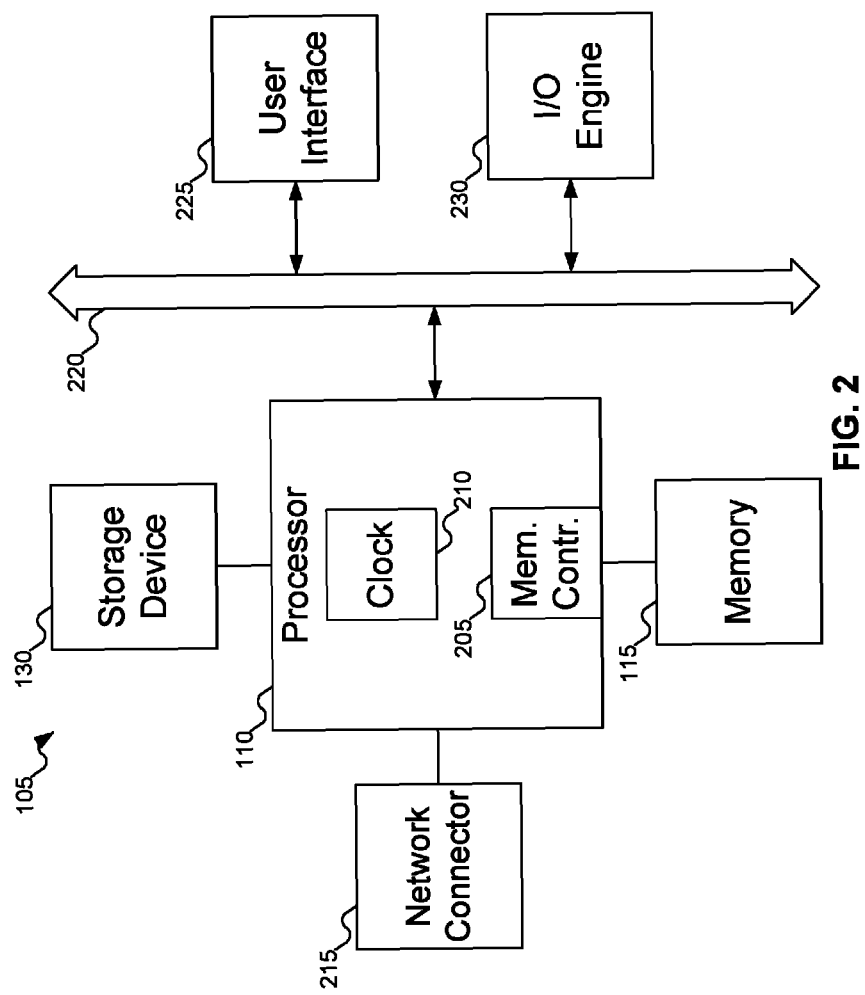
FIG. 2 shows additional details of the server of FIG. 1.

FIG. 2 shows additional details of the server of FIG. 1. Referring to FIG. 2, typically, server or servers 105 include one or more processors 110, which can include memory controller 205 and clock 210, which can be used to coordinate the operations of the components of server or servers 105. Processors 110 can also be coupled to memory 115, which can include random access memory (RAM), read-only memory (ROM), or other state preserving media, as examples. Processors 105 can also be coupled to storage devices 130 and network connector 215, which can be, for example, an Ethernet connector. Processors 110 can also be connected to a bus 220, to which can be attached user interface 225 and input/output interface ports that can be managed using input/output engine 230, among other components.

Figure 3:
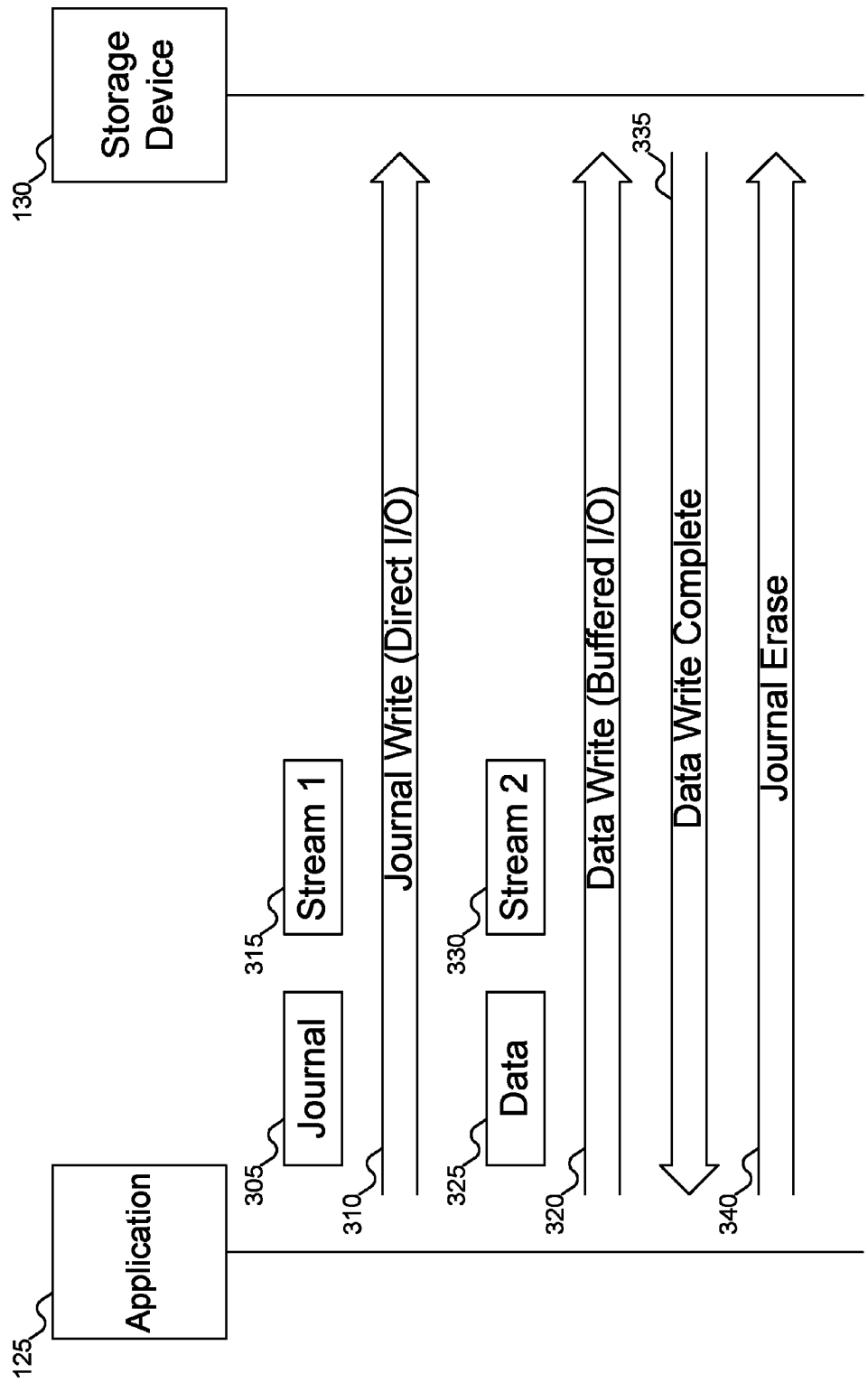
FIG. 3 shows the application of FIG. 1 communicating with the storage device of FIG. 1 to perform both journaling and data writes.

FIG. 3 shows application 125 of FIG. 1 communicating with storage device 130 of FIG. 1 to perform both journaling and data writes. In FIG. 3, application 125 is shown communicating with storage device 130 without the benefit of data storage system 120 of FIG. 1. In embodiments of the inventive concept where only one software element (represented as application 125 in FIG. 3) communicates with storage device 130, that software element can be any software element that performs journaling. Thus, application 125 could be replaced in FIG. 3 with data storage system 120 of FIG. 1 with no loss of applicability. (FIGS. 6A-6B below describe embodiments of the inventive concept where both application 125 and data storage system 120 of FIG. 1 perform journaling with storage device 130.)

In FIG. 3, application 125 can send journal write request 310 to storage device 130. Journal write request 310 can include journal information 305 and stream identifier 315. Stream identifier 315 can specify a particular stream to which journal information 305 is assigned. As described below with reference to FIG. 4, different streams can be associated with different blocks or superblocks on storage device 130, partitioning data based on one or more characteristics (such as expected lifetime or any other partitioning criteria). Journal write request 310 can be send using a direct input/output (I/O) command, to ensure journal information 305 is written immediately to storage device 130. Alternatively, journal write request 310 can be sent to a buffer that is immediately flushed (even if not full), again to ensure journal information 305 is written immediately to storage device 130.

Application 125 can also send data write request 320 to storage device 130. Data write request 320 can include data 325 and stream identifier 330. Stream identifier 330 can identify a different stream from stream identifier 315, to have data 325 written to a different stream (and therefore to a different block or superblock) than journal information 305. Because journal write request 310 was written to storage device 130 immediately, data write request 320 can be sent as a buffered write request, where data 325 can be written to storage device 130 eventually but not necessarily immediately.

Eventually, storage device 130 can send signal 335 to application 125. Signal 335 can indicate that data write request 320 has completed and that data 325 has been written to storage device 130. At this point, journal information 305 is no longer needed to ensure that the data is written somewhere on storage device 130. On storage devices that perform garbage collection, data is typically invalidated before it can be deleted via garbage collection. Thus, application 125 can send invalidate request 340 to storage device 130, requesting that journal information 305 be deleted from storage device 130. Since journal information 305 was written to a different block (or superblock) than data 325, invalidate request 340 will not result in validity-fragmented blocks (or superblocks) within storage device 130.

Figure 4:
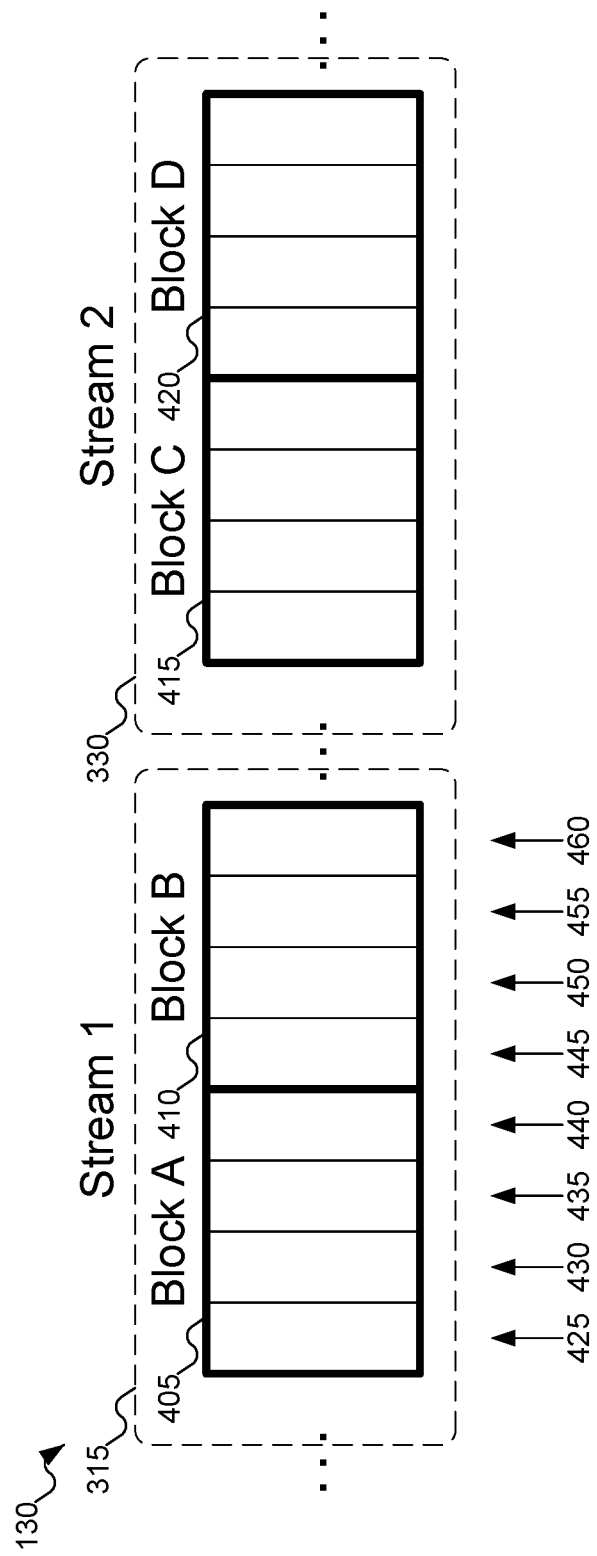
FIG. 4 shows the storage device of FIG. 1 using multi-streaming to store journal and data.

FIG. 4 shows storage device 130 of FIG. 1 using multi-streaming to store journal and data. In FIG. 4, storage device 130 is shown divided into blocks, such as blocks 405, 410 415, and 420, among others. Each block can be divided, in turn, into pages: for example, block 405 is shown as including pages 425, 430, 435, and 440, and block 410 is shown as including pages 445, 450, 455, and 460. While FIG. 4 shows blocks 405, 410, 415, and 420 each having four pages, blocks 405, 410, 415, and 420 can include any desired number of pages, with four as shown being merely an example.

As can occur with SSDs, the page can represent the minimum unit of data that can be read from or written to storage device 130. By contrast, in some embodiments of the inventive concept, the block can represent the minimum unit of data upon which garbage collection is performed. In other embodiments of the inventive concept (not shown in FIG. 4), the blocks of storage device 130 can be organized into larger groups called superblocks, which can be the minimum unit of data upon which garbage collection is performed. Regardless of whether garbage collection is performed on blocks or superblocks, the minimum unit of garbage collection is larger than the page. This discrepancy can explain why garbage collection can have a negative impact on the operation of storage device 130: if there is valid data in one or more pages of a block targeted for garbage collection, that data must be copied to another block before the block can be subject to garbage collection. For example, if page 425 contains valid data, that data must be copied to, say, page 445 in block 410 (assuming page 445 is free) before block 405 can be subject to garbage collection.

In some embodiments of the inventive concept, pages can be organized into blocks. But rather than performing garbage collection on blocks, the blocks can be organized into superblocks, with garbage collection performed on a superblock. But while the concept of a superblock can have effects on the implementation of garbage collection in storage device 130, from a theoretical point of view a superblock is little more than a redefinition of the size of a block for garbage collection purposes. Any discussion pertaining to blocks can be understood to apply to superblocks as well.

As noted above with reference to FIG. 3, individual blocks can be assigned to streams. For example, blocks 405 and 410 can be assigned to stream 315, whereas blocks 415 and 420 can be assigned to stream 330. In embodiments of the inventive concept, where "hot" and "cold" data can be divided into different streams, stream assignment can avoid the intermingling of journal writes and data writes that can cause garbage collection operations to be problematic.

Figure 5A:
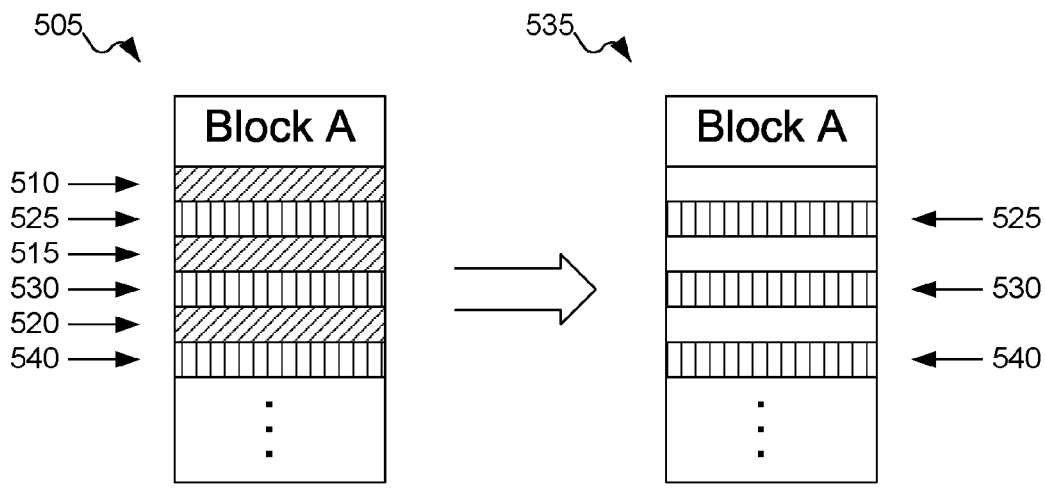
FIGS. 5A-5B show a comparison of the use of the storage device of FIG. 1 using traditional approaches vs. embodiments of the inventive concept.
Figure 5B:
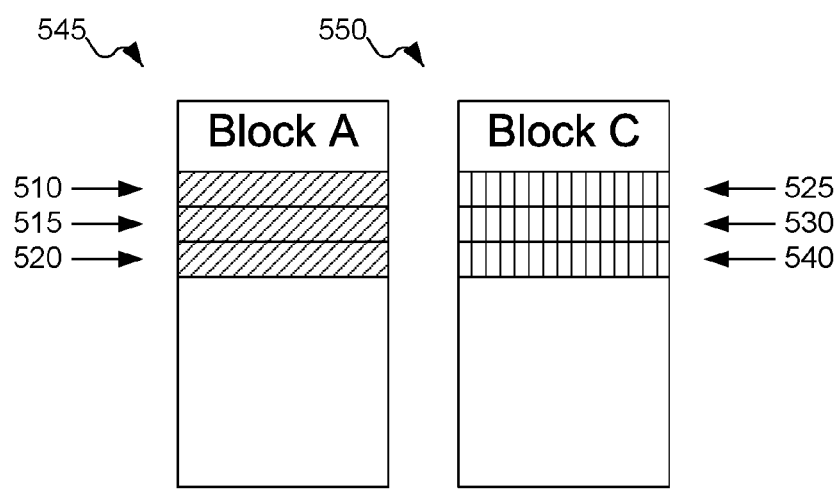

FIGS. 5A-5B show a comparison of the use of storage device 130 using traditional approaches vs. embodiments of the inventive concept. As described above, in traditional systems journal writes and data writes are written to the same block in storage device 130 of FIG. 1. In FIG. 5A, block 505 is shown with pages 510, 515, and 520 containing journal writes and blocks 525, 530, and 540 containing data writes. Because journal writes tend to have a short lifespan (as they can be deleted once the corresponding data writes complete), the intermingling of journal writes and data writes leaves a fragmented block, as shown in block 535 (which is the same block as block 505, but after the journal writes have been invalidated). If block 535 is then subject to garbage collection, pages 525, 530, and 540 must be copied to another block first. This copying takes time, slowing down other read and write operations on storage device 130.

But if, as in embodiments of the inventive concept, journal writes and data writes are sent to different streams, erasing journal writes does not leave a fragmented block. FIG. 5B shows this situation. In FIG. 5B, journal writes are sent to block 545; data writes are sent to block 550. When journal writes 510, 515, and 520 are invalidated, block 545 does not store any data that needs to be copied to another block; data writes 525, 530, and 540 are stored in block 550. (While the above description simplifies the situation, as journal writes are not necessarily all eased at the same time, typically journal writes are deleted relatively shortly after they are written, especially compared with the lifetime of data writes. Therefore, all data in block 545 should be invalidated shortly after the last journal write is written to block 545, and the entire block can be subject to garbage collection without having to copy any data to another block.)

Figure 6A:
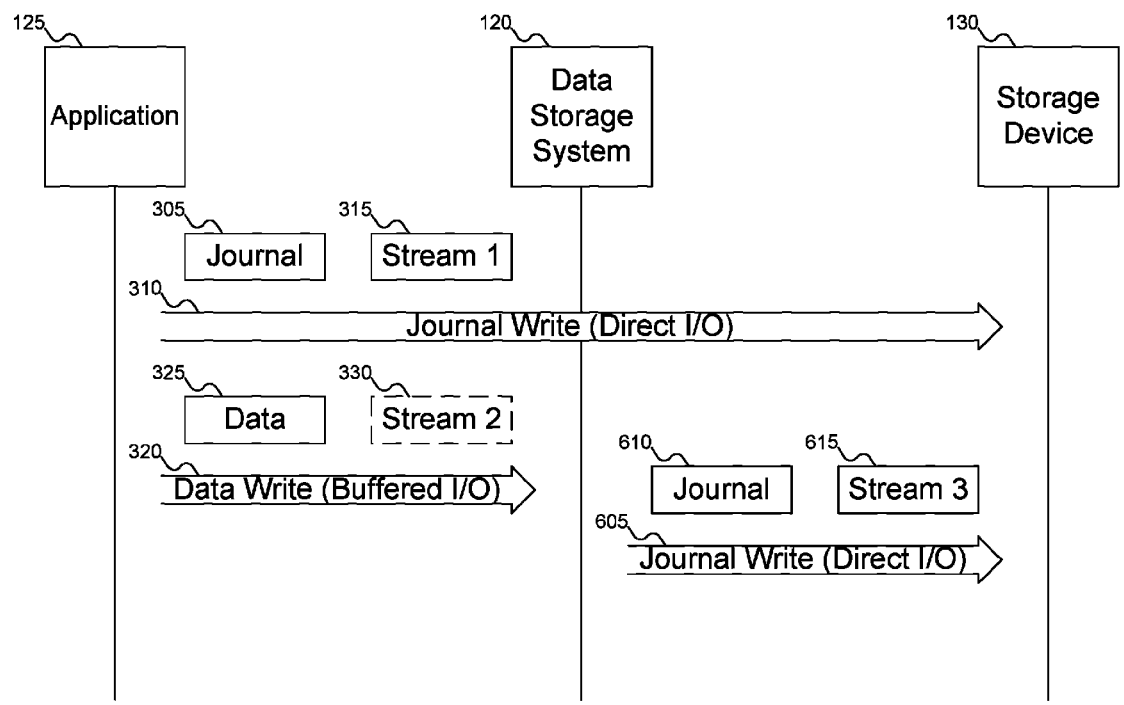
FIGS. 6A-6B show the application of FIG. 1 and the data storage system of FIG. 1 communicating with the storage device of FIG. 1 to perform both journaling and data writes.
Figure 6B:
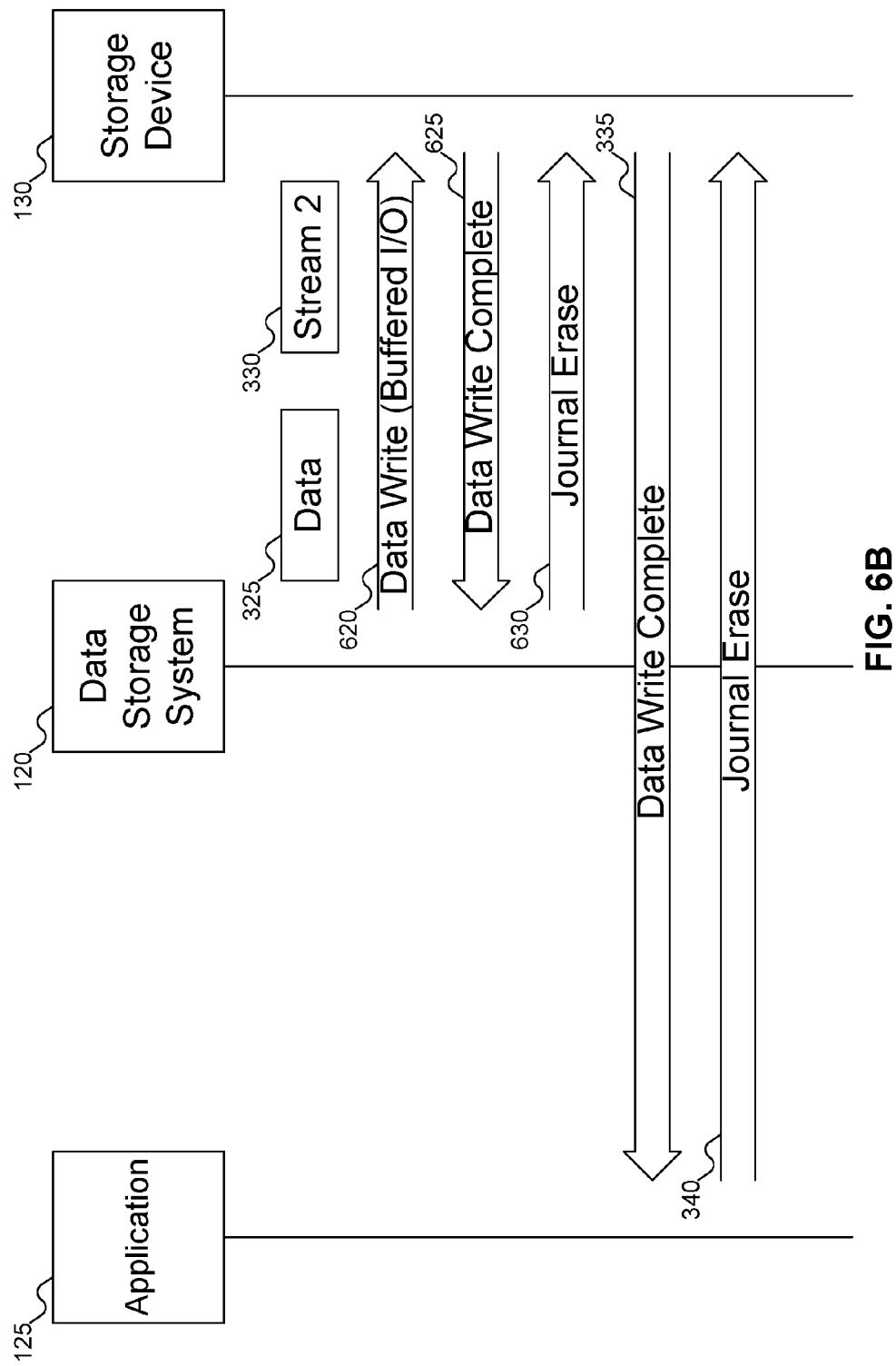

FIGS. 6A-6B show application 125 of FIG. 1 and data storage system 120 of FIG. 1 communicating with storage device 130 of FIG. 1 to perform both journaling and data writes. In contrast to FIG. 3, where application 125 was communicating with storage device 130 without the benefit of data storage system 120, FIGS. 6A-6B can include data storage system 120 in the sequence of events.

In FIG. 6A, application 125 sends journal write request 310, with journal information 305 and stream identifier 315 as before. As journal write request 310 can be a direct I/O command, FIG. 6A shows application 125 sending journal write request 310 to storage device 805, bypassing data storage system 120. But in other embodiments of the inventive concept, application 125 can send journal write request 310 to data storage system 120, with instructions to have data storage system 120 perform a direct I/O command to complete journal write request 310. In contrast with FIG. 3, however, application 125 sends data write request 320, with data 325 and stream identifier 330, to data storage system 120: not to storage device 130. Data storage system 120 can then be responsible for overseeing writing data 325 to storage device 130.

Because data storage system 120 can itself perform journaling for its own data and/or metadata, data storage system 120 can send journal write request 605 to storage device 130. Journal write request 605 can include journal information 610 and stream identifier 615. This shows that writing a single data unit can involve multiple journals, and therefore multiple streams.

In FIG. 6B, data storage system 120 can send its own data write request 620 to storage device 130. Data write request 620 can include data 325 and stream identifier 330. Note that data 325 and stream identifier 330 in data write request 620 can be the same as in data write request 320: this makes sense, as it is the same data being written, just detoured through data storage system 120. Eventually, storage device 130 can send signal 625, informing data storage system 120 that data write request 620 has completed, after which data storage system 120 can send invalidate request 630 to delete journal information 610. Storage device 130 can also send signal 335 back to application 125 (if storage device 130 is aware of the existence of application 125), so that application 125 can send its own invalidate request 340. But in other embodiments of the inventive concept, data storage system 120 can use invalidate request 630 to delete both journal information 610 and journal information 305. And in yet other embodiments of the inventive concept, data storage system 120 can send signal 335 to application 125, to inform application 125 that it can send invalidate request 340.

In the embodiments of the inventive concept discussed above, application 125 and/or data storage system 120 are responsible for erasing journal information 305 and/or 610. Thus, application 125 and/or data storage system 120 need to receive signals 335 and/or 625, to know when it is safe to delete journal information 305 and/or 610. But in other embodiments of the inventive concept, storage device 130 can be aware of the source of data 315, and can automatically delete journal information 305 and/or 610 once data write requests 320 and/or 620 complete, obviating the need for application 125 and/or data storage system 120 to send invalidate requests 340 and/or 630.

In some embodiments of the inventive concept, multiple instances of data storage system 120 can coexist on a single storage device 130. For example, storage device 130 might have multiple journaling file system partitions. Or, storage device 130 might hold multiple object storage instances. In such embodiments of the inventive concept, each instance of data storage system 120 can send its own journal write requests 605 to the same storage device 130. Each individual journal write request 605 can include its own journal information 610 and stream identifier 615. Each instance of data storage system 120 can send its own data write requests 620 to the same storage device 130. Each individual data write request 620 can include its own data 325 and stream identifier 330. Each instance of data storage system 120 can store its own journal information 610 and data 325 to different streams, and then storage device 130 can store the various journal information 610 and data 325 in different blocks or superblocks. Thus, in addition to journal information 610 and data 325 for an individual instance of data storage system 120 being in different blocks or superblocks, different journal information 610 from different instances of data storage system 120 can be stored in different blocks or superblocks, and different data 325 from different instances of data storage system 120 can be stored in different blocks or superblocks.

Figure 7B:
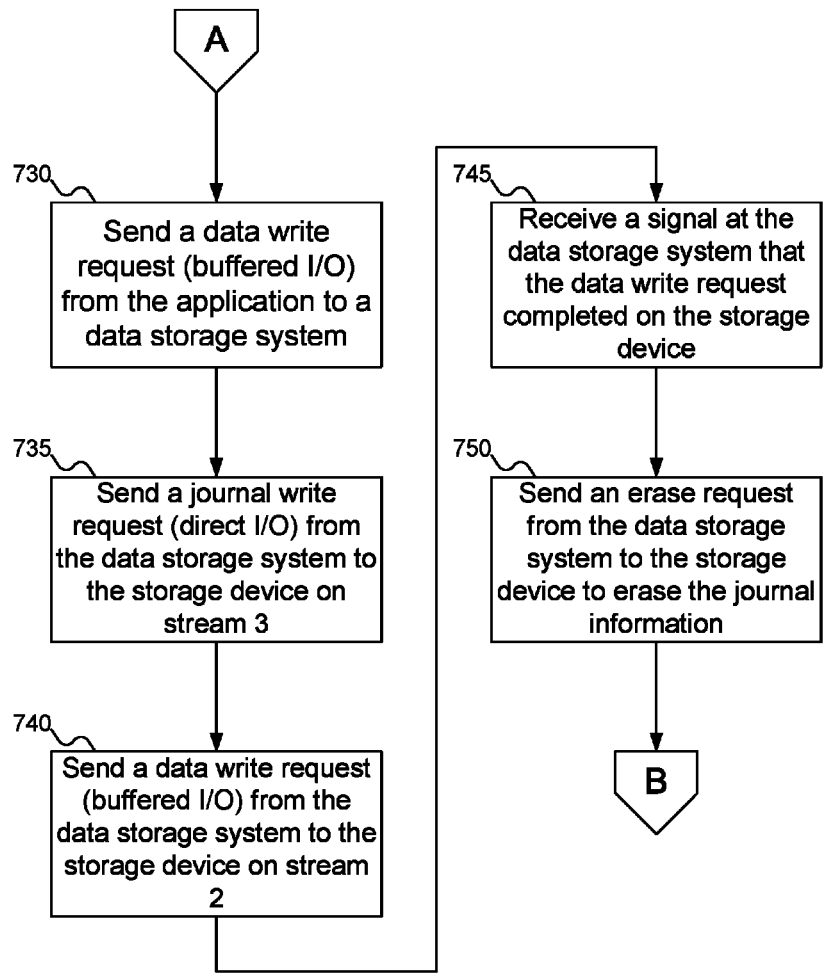

FIGS. 7A-7B show a flowchart of an example procedure for application 125 of FIG. 1 and data storage system 120 of FIG. 1 to communicate with storage device 130 of FIG. 1 and perform both journaling and data writes, according to an embodiment of the inventive concept. In FIG. 7A, at block 705, application 125 of FIG. 1 can identify data 325 of FIG. 3 to be written to storage device 130 of FIG. 1. At block 710, application 125 of FIG. 1 can send journal write request 310 of FIG. 3 as a direct I/O command to storage device 130 of FIG. 1, specifying stream identifier 315 of FIG. 3 as the stream to use for journal information 305 of FIG. 3.

At this point, operations can proceed along different paths. In some embodiments of the inventive concept, at block 715, application 125 of FIG. 1 can send data write request 320 of FIG. 3 as a buffered I/O command to storage device 130 of FIG. 3. Then, at block 720, application 125 of FIG. 1 can receive from storage device 130 of FIG. 1 signal 335 indicating that data write request 320 of FIG. 3 has completed. Finally, at block 725 application 125 of FIG. 1 can send invalidate request 340 of FIG. 3 to storage device 130 of FIG. 1, to delete journal information 305 of FIG. 3.

Alternatively, in other embodiments of the inventive concept, application 125 of FIG. 1 might not send data write request 320 of FIG. 3 to storage device 130 of FIG. 1. Instead, at block 730, application 125 of FIG. 1 can send data write request 320 of FIG. 3 to data storage system 120 of FIG. 1. At block 735, data storage system 120 of FIG. 1 can send second journal write request 605 of FIG. 6A to storage device 130 of FIG. 1. At block 740, data storage system 120 of FIG. 1 can send second data write request 620 of FIG. 6B to storage device 130 of FIG. 1. At block 745, data storage system 120 of FIG. 1 can receive signal 625 of FIG. 6B from storage device 130 of FIG. 1, indicating that data write request 620 of FIG. 6B has completed. And at block 750, data storage system 120 of FIG. 1 can send invalidate request 630 of FIG. 6B to storage device 130 of FIG. 1, to delete journal information 610 of FIG. 6A. Processing can then continue with block 720 of FIG. 7A.

In FIGS. 7A-7B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a system, comprising:

a computer (105), including a processor (110) and a memory (115);

a storage device (130);

an application (125) running on the processor (110), the application (125) operative to send both a journal write request (310) and a data write request (320) to the storage device (130), the journal write request (310) including a journal information (305) and associated with a first stream (315), and the data write request (320) including a data (325) and associated with a second stream (330); and a controller (135) on the storage device (130), the controller (135) operative to instruct the storage device (130) write the journal information (305) to a first block (405, 410) associated with the first stream (315) and to write the data (325) to a second block (415, 420) associated with a second stream (330).

Statement 2. An embodiment of the inventive concept includes a system according to statement 1, wherein the storage device (130) includes a Solid State Drive (SSD).

Statement 3. An embodiment of the inventive concept includes a system according to statement 1, wherein the application (125) is operative to send the journal write request (310) using a direct input/output (I/O) command (310) to the storage device (130).

Statement 4. An embodiment of the inventive concept includes a system according to statement 1, wherein the application (125) is operative to send the data write request (320) using a buffered write command (320) to the storage device (130).

Statement 5. An embodiment of the inventive concept includes a system according to statement 1, wherein the controller (135) is operative to receive an invalidate request (340) to delete the journal information (305) after the data write request (320) completes.

Statement 6. An embodiment of the inventive concept includes a system according to statement 5, wherein the application (125) is operative to send the invalidate request (340).

Statement 7. An embodiment of the inventive concept includes a system according to statement 6, wherein the application (125) is operative to send the invalidate request (340) responsive to the application (125) receiving a signal (335) that the data write request (320) has completed.

Statement 8. An embodiment of the inventive concept includes a system according to statement 7, wherein the application (125) is operative to send the invalidate request (340) responsive to the application (125) receiving from the controller (135) the signal (335) that the data write request (320) has completed.

Statement 9. An embodiment of the inventive concept includes a system according to statement 1, wherein:

the application (125) is operative to send the data write request (320) to a data storage system (120) running on the processor (110); and the data storage system (120) is operative to send a second data write request (620) to the storage device (130), the second data write request (620) including the data (325) and associated with the second stream (330).

Statement 10. An embodiment of the inventive concept includes a system according to statement 9, wherein the data storage system (120) is further operative to send a second journal write request (605) to the storage device (130), the second journal write request (605) including a second journal information (610) and associated with a third stream (615).

Statement 11. An embodiment of the inventive concept includes a system according to statement 10, wherein the data storage system (120) is further operative to send a second invalidate request (630).

Statement 12. An embodiment of the inventive concept includes a system according to statement 10, wherein the data storage system (120) is operative to send the second invalidate request (630) responsive to the data storage system (120) receiving a second signal (625) that the second data write request (620) has completed.

Statement 13. An embodiment of the inventive concept includes a system according to statement 12, wherein the data storage system (120) is operative to send the second invalidate request (630) responsive to the data storage system (120) receiving from the controller (135) the second signal (625) that the second data write request (620) has completed.

Statement 14. An embodiment of the inventive concept includes a method, comprising:

identifying (705) a data (325) to be written from an application (125) that performs both a journal write (310) and a data write (320);

sending (710) a journal write request (310) from the application (125) to a storage device (130) that performs garbage collection on invalid data (325), the journal write request (310) assigned to a first stream (315); and sending (715) a data write request (320) from the application (125) to the storage device (130), the data write request (320) assigned to a second stream (330).

Statement 15. An embodiment of the inventive concept includes a method according to statement 14, wherein:

sending (710) a journal write request (310) from the application (125) to a storage device (130) includes sending (710) the journal write request (310) from the application (125) to a Solid State Drive (SSD); and sending (715) a data write request (320) from the application (125) to the storage device (130) includes sending (715) the data write request (320) from the application (125) to the SSD.

Statement 16. An embodiment of the inventive concept includes a method according to statement 14, wherein:

sending (710) a journal write request (310) from the application (125) to the storage device (130) includes sending (710) the journal write request (310) from the application (125) to the storage device (130) using a direct input/output (I/O) command (310); and sending (715) a data write request (320) from the application (125) to the storage device (130) includes sending (715) the data write request (320) from the application (125) to the storage device (130) using a buffered write command (320).

Statement 17. An embodiment of the inventive concept includes a method according to statement 14, further comprising sending (725) an invalidate request (340, 630) to the storage device (130) to delete the journal information (305) after the data write request (320) is written to the storage device (130).

Statement 18. An embodiment of the inventive concept includes a method according to statement 17, wherein sending (725) an invalidate request (340, 630) to the storage device (130) includes sending (725) the invalidate request (340) from the application (125) to the storage device (130).

Statement 19. An embodiment of the inventive concept includes a method according to statement 18, wherein sending (725) an invalidate request (340) from the application (125) to the storage device (130) includes receiving (720) a signal (335) at the application (125) that the data write request (320) on the storage device (130) has completed.

Statement 20. An embodiment of the inventive concept includes a method according to statement 19, wherein receiving (720) a signal (335) at the application (125) that the data write request (320) on the storage device (130) has completed includes receiving (720) the signal (335) from the storage device (130) at the application (125) that the data write request (320) on the storage device (130) has completed.

Statement 21. An embodiment of the inventive concept includes a method according to statement 14, wherein sending (715) a data write request (320) from the application (125) to the storage device (130) includes:

sending (730) a data write request (320) from the application (125) to a data storage system (120); and sending (740) a second data write request (620) from the data storage system (120) to the storage device (130).

Statement 22. An embodiment of the inventive concept includes a method according to statement 21, wherein sending (740) a second data write request (620) from the data storage system (120) to the storage device (130) includes sending (735) a second journal write request (605) from the data storage system (120) to the storage device (130).

Statement 23. An embodiment of the inventive concept includes a method according to statement 22, further comprising sending (750) an invalidate request (340, 630) to the storage device (130) to delete the data (325) written by the second journal write request (605) after the second data write request (620) is written to the storage device (130).

Statement 24. An embodiment of the inventive concept includes a method according to statement 23, wherein sending (750) an invalidate request (340, 630) to the storage device (130) includes sending (750) the invalidate request (630) from the data storage system (120) to the storage device (130).

Statement 25. An embodiment of the inventive concept includes a method according to statement 24, wherein sending (750) an invalidate request (630) from the data storage system (120) to the storage device (130) includes receiving (745) a signal (625) at the data storage system (120) that the data write request (320) on the storage device (130) has completed.

Statement 26. An embodiment of the inventive concept includes a method according to statement 25, wherein receiving (745) a signal (625) from the data storage system (120) that the data write request (320) on the storage device (130) has completed includes receiving (745) the signal (625) from the storage device (130) at the data storage system (120) that the data write request (320) on the storage device (130) has completed.

Statement 27. An embodiment of the inventive concept includes an article, comprising a tangible storage medium, the tangible storage medium having stored thereon non-transitory instructions that, when executed by a machine, result in:

identifying (705) a data (325) to be written from an application (125) that performs both a journal write (310) and a data write (320);

sending (710) a journal write request (310) from the application (125) to a storage device (130) that performs garbage collection on invalid data (325), the journal write request (310) assigned to a first stream (315); and sending (715) a data write request (320) from the application (125) to the storage device (130), the data write request (320) assigned to a second stream (330).

Statement 28. An embodiment of the inventive concept includes an article according to statement 27, wherein:

sending (710) a journal write request (310) from the application (125) to a storage device (130) includes sending (710) the journal write request (310) from the application (125) to a Solid State Drive (SSD); and sending (715) a data write request (320) from the application (125) to the storage device (130) includes sending (715) the data write request (320) from the application (125) to the SSD.

Statement 29. An embodiment of the inventive concept includes an article according to statement 27, wherein:

sending (710) a journal write request (310) from the application (125) to the storage device (130) includes sending (710) the journal write request (310) from the application (125) to the storage device (130) using a direct input/output (I/O) command (310); and sending (715) a data write request (320) from the application (125) to the storage device (130) includes sending (715) the data write request (320) from the application (125) to the storage device (130) using a buffered write command (320).

Statement 30. An embodiment of the inventive concept includes an article according to statement 27, the tangible storage medium having stored thereon further non-transitory instructions that, when executed by the machine, result in sending (725) an invalidate request (340, 630) to the storage device (130) to delete the journal information (305) after the data write request (320) is written to the storage device (130).

Statement 31. An embodiment of the inventive concept includes an article according to statement 30, wherein sending (725) an invalidate request (340, 630) to the storage device (130) includes sending (725) the invalidate request (340) from the application (125) to the storage device (130).

Statement 32. An embodiment of the inventive concept includes an article according to statement 31, wherein sending (725) an invalidate request (340) from the application (125) to the storage device (130) includes receiving (720) a signal (335) at the application (125) that the data write request (320) on the storage device (130) has completed.

Statement 33. An embodiment of the inventive concept includes an article according to statement 32, wherein receiving (720) a signal (335) at the application (125) that the data write request (320) on the storage device (130) has completed includes receiving (720) the signal (335) from the storage device (130) at the application (125) that the data write request (320) on the storage device (130) has completed.

Statement 34. An embodiment of the inventive concept includes an article according to statement 27, wherein sending (715) a data write request (320) from the application (125) to the storage device (130) includes:

sending (730) a data write request (320) from the application (125) to a data storage system (120); and sending (740) a second data write request (620) from the data storage system (120) to the storage device (130).

Statement 35. An embodiment of the inventive concept includes an article according to statement 34, wherein sending (740) a second data write request (620) from the data storage system (120) to the storage device (130) includes sending (735) a second journal write request (605) from the data storage system (120) to the storage device (130).

Statement 36. An embodiment of the inventive concept includes an article according to statement 35, the tangible storage medium having stored thereon further non-transitory instructions that, when executed by the machine, result in sending (750) an invalidate request (340, 630) to the storage device (130) to delete the data (325) written by the second journal write request (605) after the second data write request (620) is written to the storage device (130).

Statement 37. An embodiment of the inventive concept includes an article according to statement 36, wherein sending (750) an invalidate request (340, 630) to the storage device (130) includes sending (750) the invalidate request (630) from the data storage system (120) to the storage device (130).

Statement 38. An embodiment of the inventive concept includes an article according to statement 37, wherein sending (750) an invalidate request (630) from the data storage system (120) to the storage device (130) includes receiving (745) a signal (625) at the data storage system (120) that the data write request (320) on the storage device (130) has completed.

Statement 39. An embodiment of the inventive concept includes an article according to statement 38, wherein receiving (745) a signal (625) from the data storage system (120) that the data write request (320) on the storage device (130) has completed includes receiving (745) the signal (625) from the storage device (130) at the data storage system (120) that the data write request (320) on the storage device (130) has completed.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
   a computer, including a processor and a memory;
   a storage device;
   an application running on the processor, the application operative to send a journal write request to the storage device and to send a data write request to a data storage system running on the processor, the journal write request including a journal information and assigned to a first stream, and the data write request including a data and assigned to a second stream;
   the data storage system is operative to send a second journal write request to the storage device, the second journal write request including a second journal information and assigned to a third stream, and to send a second data write request to the storage device, the second data write request including the data and assigned to the second stream; and
   a controller on the storage device, the controller operative to instruct the storage device to write the journal information to a first block assigned to the first stream, to write the data to a second block assigned to a second stream, and to write the second journal information to a third block assigned to the third stream,
   wherein the first stream, second stream, and third stream are defined by data characteristics.

2. A system according to claim 1, wherein the controller is operative to receive an invalidate request to delete the journal information after the data write request completes.

3. A system according to claim 2, wherein the application is operative to send the invalidate request.

4. A system according to claim 3, wherein the application is operative to send the invalidate request responsive to the application receiving a signal that the data write request has completed.

5. A system according to claim 1, wherein the data storage system is further operative to send a second invalidate request.

6. A system according to claim 5, wherein the data storage system is further operative to send the second invalidate request to the storage device to delete the journal information after the second data write request completes.

7. A system according to claim 1, wherein:
   the journal write request is sent as a direct Input/Output (I/O) request; and
   the data write request is sent as a buffered Input/Output (I/O) request,
   wherein the journal write request is used to ensure that the data in the data write request is written to the storage device.

8. A system according to claim 1, wherein the data included in the second data write request is the data in the data write request.

9. A system according to claim 1, wherein the journal write request is used to ensure that the data in the data write request is written to the storage device.

10. A system according to claim 1, wherein the third block is the first block.

11. A system according to claim 1, wherein:
    the journal write request is assigned to the first stream by the application; and
    the data write request is assigned to the second stream by the application.

12. A system according to claim 1, wherein the first block and the second block are of a single media type.

13. A method, comprising:
    identifying a data to be written from an application that performs both a journal write and a data write;
    sending a journal write request from the application to a storage device that performs garbage collection on invalid data, the journal write request assigned to a first stream, the journal write request sent as a direct Input/Output (I/O) request;
    sending a data write request from the application to a data storage system, the data write request including the data and assigned to a second stream, the data write request sent as a buffered Input/Output (I/O) request;
    sending a second journal write request from the data storage system to the storage device, the second journal write request assigned to a third stream; and
    sending a second data write request from the data storage system to the storage device, the second data write request assigned to the second stream and including the data,
    wherein the journal write request and the second journal write request are used to ensure that the data in the data write request is written to the storage device.

14. A method according to claim 13, further comprising sending an invalidate request to the storage device to delete the journal information after the data write request is written to the storage device.

15. A method according to claim 14, wherein sending an invalidate request to the storage device includes sending the invalidate request from the application to the storage device.

16. A method according to claim 15, wherein sending an invalidate request from the application to the storage device includes receiving a signal at the application that the data write request on the storage device has completed.

17. A method according to claim 13, further comprising sending an invalidate request to the storage device to delete the data written by the second journal write request after the second data write request is written to the storage device.

18. An article, comprising a tangible storage medium, the tangible storage medium having stored thereon non-transitory instructions that, when executed by a machine, result in:
   identifying a data to be written from an application that performs both a journal write and a data write;
   sending a journal write request from the application to a storage device that performs garbage collection on invalid data, the journal write request assigned to a first stream, the journal write request sent as a direct Input/Output (I/O) request;
   sending a data write request from the application to a data storage system, the data write request including the data and assigned to a second stream, the data write request sent as a buffered Input/Output (I/O) request;
   sending a second journal write request from the data storage system to the storage device, the second journal write request assigned to a third stream; and
   sending a second data write request from the data storage system to the storage device, the second data write request assigned to the second stream and including the data,
   wherein the journal write request and the second journal write request are used to ensure that the data in the data write request is written to the storage device.

19. An article according to claim 18, the tangible storage medium having stored thereon further non-transitory instructions that, when executed by the machine, result in sending an invalidate request to the storage device to delete the journal information after the data write request is written to the storage device.

20. An article according to claim 19, wherein sending an invalidate request to the storage device includes sending the invalidate request from the application to the storage device.

21. An article according to claim 18, the tangible storage medium having stored thereon further non-transitory instructions that, when executed by the machine, result in sending an invalidate request to the storage device to delete the data written by the second journal write request after the second data write request is written to the storage device.

* * * * *